United States Patent
Håkansson et al.

(10) Patent No.: US 10,148,783 B2
(45) Date of Patent: Dec. 4, 2018

(54) METHOD AND CONTENT MANAGEMENT MODULE FOR MANAGING CONTENT IN A CONTENT DISTRIBUTION NETWORK

(71) Applicant: Telefonaktiebolaget L M Ericsson (publ), Stockholm (SE)

(72) Inventors: Stefan Håkansson, Luleå (SE); Azam Akram, Kista (SE); Göran Eriksson, Norrtälje (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 635 days.

(21) Appl. No.: 14/433,417

(22) PCT Filed: Dec. 18, 2014

(86) PCT No.: PCT/SE2014/051534
§ 371 (c)(1),
(2) Date: Apr. 3, 2015

(87) PCT Pub. No.: WO2016/099356
PCT Pub. Date: Jun. 23, 2016

(65) Prior Publication Data
US 2016/0344833 A1 Nov. 24, 2016

(51) Int. Cl.
*H04L 29/08* (2006.01)
*H04L 29/06* (2006.01)
(Continued)

(52) U.S. Cl.
CPC ...... *H04L 67/2842* (2013.01); *H04L 65/4084* (2013.01); *H04L 65/60* (2013.01);
(Continued)

(58) Field of Classification Search
CPC ........... G06F 17/30902; H04L 67/2842; H04L 67/288; H04L 67/1008; H04N 21/23103
See application file for complete search history.

(56) References Cited

U.S. PATENT DOCUMENTS

| | | | | |
|---|---|---|---|---|
| 7,937,477 B1* | 5/2011 | Day | ..................... | G06Q 20/401 709/227 |
| 2005/0120133 A1* | 6/2005 | Slack-Smith | ....... | G06F 12/0862 709/234 |

(Continued)

FOREIGN PATENT DOCUMENTS

| | | |
|---|---|---|
| EP | 2290912 A1 | 3/2011 |
| EP | 2701070 A1 | 2/2014 |

*Primary Examiner* — Barbara N Burgess
(74) *Attorney, Agent, or Firm* — Murphy, Bilak & Homiller, PLLC

(57) ABSTRACT

A method, a content management module (110), a computer program (503) and a carrier (505) for managing content in a content distribution network (100) are disclosed. The content distribution network (100) comprises a plurality of caches (140), a content serving node (120), a client device (130). The content management module (110) obtains an indication that the content is to be delivered, in an upcoming time period, to the client device (130). The content management module (110) obtains a transport capability parameter relating to transport capability, in a past time period, from the plurality of caches (140) to an output means (131). The content management module (110) predicts, for said each cache, a respective predicted transport capability based on the respective set of parameters. The content management module (110) segments the content into a plurality of segments based on the respective predicted transport capability. The content management module (110) selects at least one respective cache (141-144) based on the respective predicted transport capabilities. The content management module (110) provides a respective command to the content serving node (120). The respective command instructs the content serving node (120) to feed said each segment to the selected at least one respective cache.

27 Claims, 5 Drawing Sheets

(51) Int. Cl.
| | |
|---|---|
| H04N 21/231 | (2011.01) |
| H04N 21/2343 | (2011.01) |
| H04N 21/262 | (2011.01) |
| H04N 21/414 | (2011.01) |
| H04N 21/433 | (2011.01) |
| H04N 21/462 | (2011.01) |
| H04N 21/482 | (2011.01) |
| H04N 21/61 | (2011.01) |
| H04N 21/643 | (2011.01) |
| H04N 21/647 | (2011.01) |
| H04N 21/845 | (2011.01) |

(52) U.S. Cl.
CPC .......... *H04L 65/80* (2013.01); *H04L 67/2852* (2013.01); *H04N 21/231* (2013.01); *H04N 21/23103* (2013.01); *H04N 21/23106* (2013.01); *H04N 21/23116* (2013.01); *H04N 21/23439* (2013.01); *H04N 21/26258* (2013.01); *H04N 21/41407* (2013.01); *H04N 21/4331* (2013.01); *H04N 21/4621* (2013.01); *H04N 21/4825* (2013.01); *H04N 21/6125* (2013.01); *H04N 21/64322* (2013.01); *H04N 21/64792* (2013.01); *H04N 21/8456* (2013.01)

(56) References Cited

U.S. PATENT DOCUMENTS

| | | | |
|---|---|---|---|
| 2010/0218231 A1* | 8/2010 | Frink | H04N 7/17318 725/118 |
| 2012/0009890 A1* | 1/2012 | Curcio | H04L 29/06 455/230 |
| 2012/0110113 A1* | 5/2012 | Lee | H04L 67/288 709/214 |
| 2013/0282855 A1* | 10/2013 | Lee | G06F 15/167 709/213 |
| 2014/0133316 A1* | 5/2014 | Yoshida | H04L 43/0888 370/250 |
| 2016/0242077 A1* | 8/2016 | Horneman | H04W 36/0016 |

\* cited by examiner

METHOD AND CONTENT MANAGEMENT MODULE FOR MANAGING CONTENT IN A CONTENT DISTRIBUTION NETWORK

TECHNICAL FIELD

Embodiments herein relate to computer networks, such as content distribution networks. In particular, a method and a content distribution module for managing content in content distribution network are disclosed. A corresponding computer program and a carrier therefor are also disclosed.

BACKGROUND

A content delivery network or a Content Distribution Network (CDN) is a system of servers that are deployed over a Wide Area Network (WAN), such as the Internet. The servers store content duplicated from a main storage keeping an original copy of the content. The servers, aka caches, serve the content to end-users based on proximity. CDNs help in delivering content, such as files, images, documents, JavaScript and the like, to the end-users at very high speeds. In CDNs, multiple copies of the content are stored on strategically dispersed caches, e.g. in terms of geography. The geographically closer a cache is to an end-user, the faster the content is delivered to that end-user, aka client.

A known CDN includes a central function for managing the content throughout the CDN. The CDN further includes a plurality of caches for providing content to clients, which may receive the content. The caches may include network connected storage devices, local servers in the proximity of the clients, radio base stations, core network nodes and the like. The central function may manage the caches as passive or active caches.

Passive caching refers to when the central function feeds content to the caches when a client has requested content from the main storage.

Active caching refers to when the central function feeds content to the caches proactively and opportunistically before a client has requested content. Hence, the central function guesses based on historical requests for content when the client will request some specific content. The specific content then will be stored at a cache in close proximity to that client.

In order for the known central function to be able to perform passive as well as active caching, the known central function receives reports from the caches. A report, from a first cache, includes for example information about available transport capabilities including bandwidth, delay variation, etc. towards clients in the proximity of the first closest cache. Based on the information about available transport capabilities, e.g. bandwidth, from the central function to the clients, the central function is able to determine at which cache content should be stored to provide efficient content delivery when possibly requested by the client in the future—in case of active caching—, or after request by the client—in case of passive caching.

A problem in this context is that the caching performed by the central function may not be sufficiently flexible in order to be able to adapt to different scenarios. In order to improve flexibility, it has been proposed to allow the central function to select parameters from a set of predetermined parameters. The selected parameters are to be reported by the caches to the central function. In this manner, the central function would be able to use one model of out a set of predetermined models for how to determine which cache to feed the content to depending on which parameters have been configured to be reported. However, alternative manners of providing flexibility may be required to further improve management of caches and content.

In an exemplifying application, the known CDN is used to deliver streaming video, from a live-source in real-time or from a library of video sequences, such as films, movies, etc. The content—a film for instance—consists of a set of segments, one or several segments can be packaged into a transport protocol and to each such data packet one or several metadata headers can be appended, for instance using HTTP transfer protocol. The meta data allows for adding descriptions of the data—the segments- and is used to enable more efficient processing decisions in intermediate caches and also that the content, the segments, are encapsulated in a secure capsule, for instance for confidentiality or integrity reasons. Each segment is typically given a unique address, enabling the entities involved to decide on storage, push and retrieval on individual segments.

Known technologies for providing video streaming include Moving Picture Experts Group (MPEG)—Dynamic Adaptive Streaming over Hypertext Transfer Protocol (DASH), Hypertext Transfer Protocol (HTTP) Live Streaming (HLS) from Apple, Smooth Streaming from Microsoft, Dynamic Streaming from Adobe and the like. In view of the above know technologies, a problem is how to find alternative solutions for managing caches and content in a more efficient and/or flexible manner.

SUMMARY

An object may be to improve, e.g. in terms of how caching is performed, the above mentioned content distribution network.

According to a first aspect, the object is achieved by a method, performed by a content management module, for managing content in a content distribution network, wherein the content distribution network comprises a plurality of caches for active caching of the content, a content serving node for serving the content to the plurality of caches, a client device to which the content is deliverable. The content management module obtains an indication that the content is to be delivered, in an upcoming time period, to the client device. The content management module obtains a respective set of parameters for each cache of the plurality of caches, wherein the respective set of parameters comprises a transport capability parameter relating to transport capability, in a past time period, from the plurality of caches to an output means for outputting of the content, wherein the output means is associated with the client device. The content management module predicts, for said each cache, a respective predicted transport capability based on the respective set of parameters, wherein each respective predicted transport capability relates to the upcoming time period. Furthermore, the content management module segments the content into a plurality of segments based on the respective predicted transport capability. For each segment of the plurality of segments, the content management module selects at least one respective cache of the plurality of caches based on the respective predicted transport capabilities, wherein the selected at least one respective cache is selected for storing of said each segment. For each segment of the plurality of segments, the content management module provides a respective command to the content serving node, wherein the respective command instructs the content serving node to feed said each segment to the selected at least one respective cache.

According to another aspect, the object is achieved by a content management module configured to manage content in a content distribution network, wherein the content distribution network comprises a plurality of caches for active caching of the content, a content serving node for serving the content to the plurality of caches, a client device to which the content is deliverable. The content management module is configured to obtain an indication that the content is to be delivered, in an upcoming time period, to the client device; and to obtain a respective set of parameters for each cache of the plurality of caches. The respective set of parameters comprises a transport capability parameter relating to transport capability, in a past time period, from the plurality of caches to an output means for outputting of the content, wherein the output means is associated with the client device. The content management module is further configured to predict, for said each cache, a respective predicted transport capability based on the respective set of parameters, wherein each respective predicted transport capability relates to the upcoming time period. Moreover, the content management module is configured to segment the content into a plurality of segments based on the respective predicted transport capability. Furthermore, the content management module is configured to, for each segment of the plurality of segments, select at least one respective cache of the plurality of caches based on the respective predicted transport capabilities, wherein the selected at least one respective cache is selected for storing of said each segment. Additionally, the content management module is configured to provide a respective command to the content serving node, wherein the respective command instructs the content serving node to feed said each segment to the selected at least one respective cache.

According to further aspects, the object is achieved by a computer program and a carrier for the computer program corresponding to the aspects above.

Thanks to that the respective transport capability parameter is considered when segmenting the content into a plurality of segments, the segments are adapted to the predicted transport capability, at the upcoming time period, of the content distribution network. This enables the client device to efficiently retrieve, e.g. considering available bandwidth, the segments from the selected at least one respective cache.

In this manner, improved control of content delivery in the content distribution network is achieved. E.g. cost in terms of bandwidth may be balanced towards a quality experienced by the end-user, i.e. quality received at the client device.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
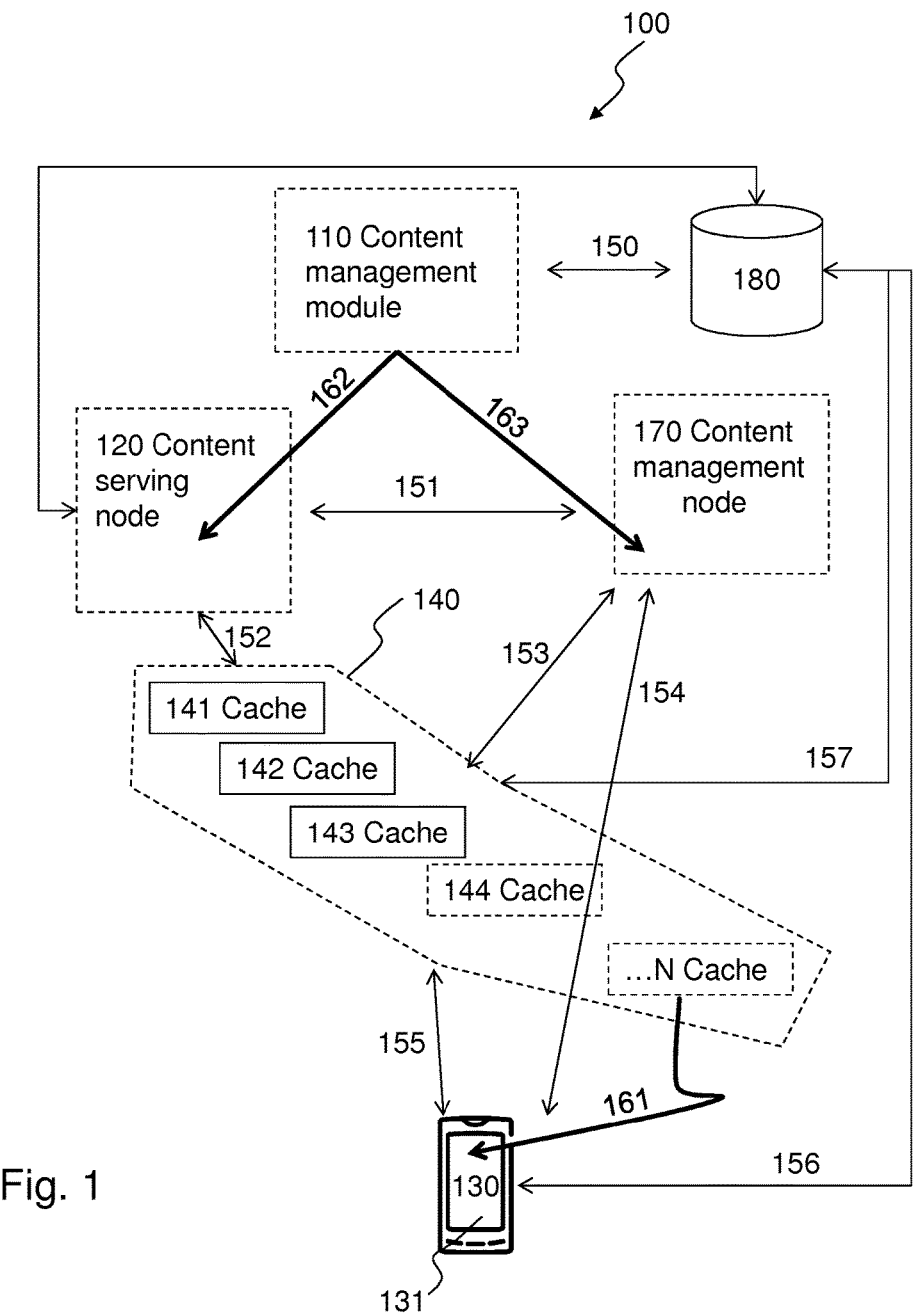
FIG. 1 is a schematic overview of an exemplifying computer network in which embodiments herein may be implemented.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

FIG. 1 depicts an exemplifying computer network 100 in which embodiments herein may be implemented. In this example, the computer network 100 is a Content Distribution Network.

The computer network 100 comprises a content management module 110. The content management module 110 may be comprised in a content serving node 120 which may serve a client device 130 with content. The content serving node 120, or content server for short, may be operated by a content provider.

The computer network 100 may further comprise a plurality of caches 140. The plurality of caches 140 may be used for active caching of the content. The plurality of caches 140 may include N caches. As an example, consider the respective caches 141-144.

The caches may be non-volatile or volatile, which means that the caches may be statically available, or temporarily available for use, albeit nothing about whether there is available storage is now considered.

Furthermore, the caches here considered may be so called intermediate caches distributed throughout the computer network 100. Some caches may be local caches comprised 161 in the client device 130. Additionally, the caches 140 may be referred to as cache units, cache devices, etc. The caches may be located in further client devices (not shown) which caches often are called peer-caches, peer-device caches or the like.

Moreover, as mentioned above the content management module 110 may be comprised 162 in the content serving node 120. As a further example, the content management module 110 may be comprised 163 in a content management node 170, which may be separate from the content serving node 120.

The computer network 100 may further comprise a database 180, with which the content management module 110 may communicate 150. For example, the content management module 110 may retrieve data, such as the set of parameters and the further set of parameters disclosed herein, from the database 180.

The content serving node 120 may be configured to communicate 151 with the content management node 170.

The content serving node 120 may be configured to communicate 152 with the plurality of caches 140.

The content management node 170 may be configured to communicate 153 with the plurality of caches 140.

The content management node 170 may be configured to communicate 154 with the client device 130.

The client device 130 may be configured to communicate 155 with the plurality of caches 140.

The client device 130 may be configured to communicate 156 with the database 180.

The database 180 may be configured to communicate 157 with the plurality of caches 140.

As used herein, the term "client device" may refer to a user equipment, a wireless device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device or the like. The term "user" may indirectly refer to the client device 130.

Figure 2:
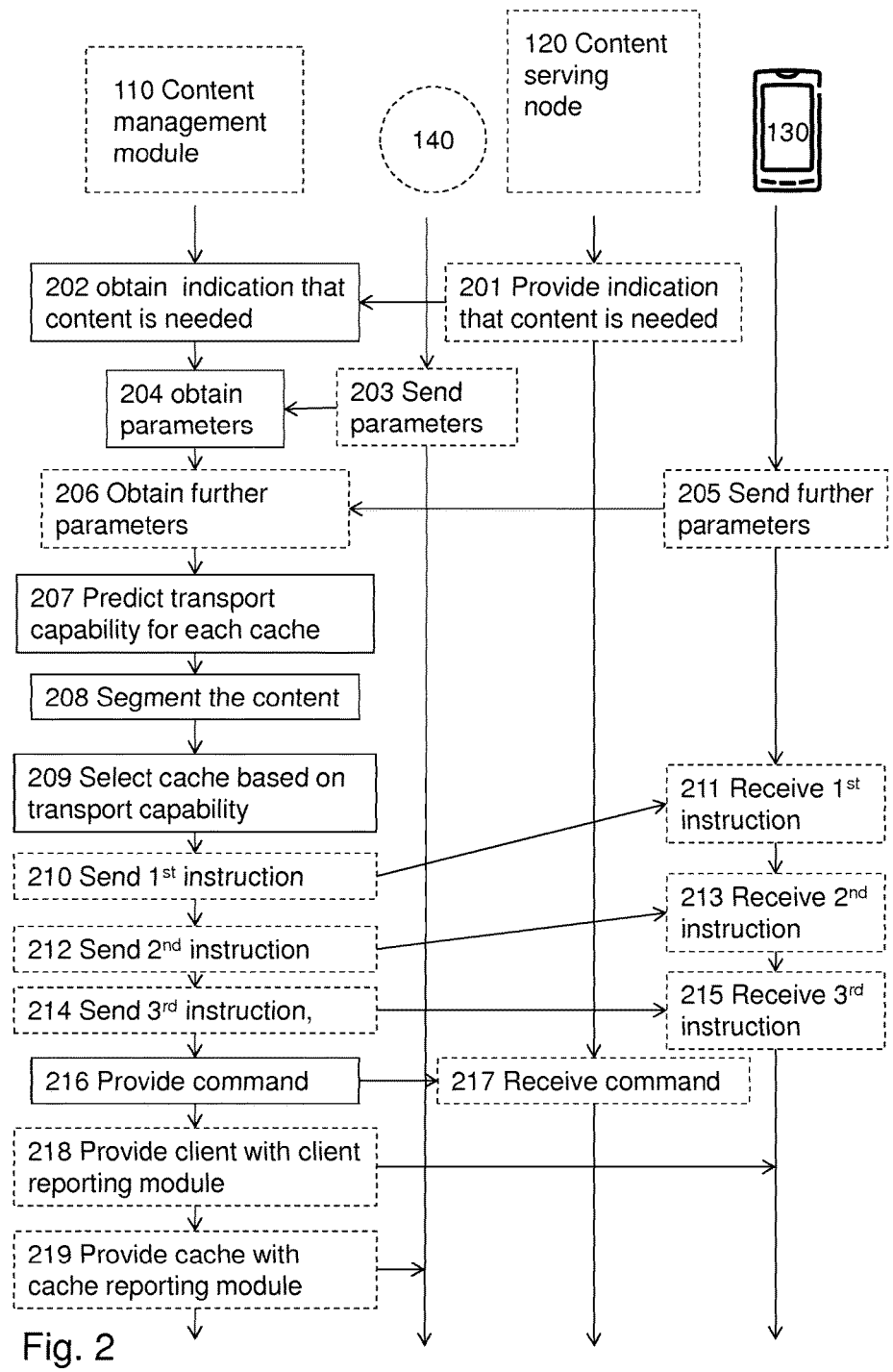
FIG. 2 is a combined signaling and flowchart illustrating the methods herein.

FIG. 2 illustrates an exemplifying method according to embodiments herein when performed in connection with the computer network 100 of FIG. 1. The content management module 110 thus performs a method for managing content in the content distribution network 100.

As mentioned, the content distribution network 100 comprises a plurality of caches 140 for active caching of the content, a content serving node 120 for serving the content to the plurality of caches 140, a client device 130 to which the content is deliverable.

The content may comprise one or more of: data, a data file, an image, a video, a text, a streamed audio, video sequence and/or the like. The client device 130 may be a M2M device or a user equipment.

As illustrated by actions 218 and 219, the client device 130 and/or one or more of the plurality of caches 140 may be provided with a respective dynamically updatable reporting module. More details concerning these modules will be provided below.

Throughout the description of FIG. 2, a particular example relating to video content, referred to as "video content example" herein, may be considered.

One of more of the following actions may be performed in any suitable order.

Action 201

The content serving node 120 may provide, e.g. send to the content management module 110, an indication that the content is to be delivered, in an upcoming time period, to the client device 130.

Content may be served to the client device 130, via the plurality of caches 140, by pushing content to the client device 130 or by that the client device 130 requests, or pulls, content from the content serving node 120.

Accordingly, the client device 130 may retrieve the content either by an explicit request to the content serving node 120 or the content serving node 120 may push suitable content to the client device 130.

Push Content

The content serving node 120, sometimes referred to as a content provider server, may control what content and its representation to be pushed to the client device 130. The client device 130 may playback the contents accordingly. The content serving node 120 is supported by, e.g. includes the content management module 110, which selects—see action 209—the content to push to the client device 130 and e.g. the closest cache or an appropriate cache to download from.

There are several motivations for pushing the contents to the client device 130. For example, the content serving node 120 predicts, see action 207, the computer network 100 behavior and appropriate content, such as film, scene or representation. Next, the content serving node 120 pushes the content to the client device 130 well in advance of the upcoming time period. The content may be saved into cache of client, or an intermediate cache.

Moreover, as in further examples, the client device does not need to send an explicit content request. This leads to savings in that a one-way delay is reduced.

The client device 130 also contributes to the content serving node's 120 selection of content—in action 209—by saving the prevailing and historic session statistics, such as received bitrate, number of re-buffering events, pre-buffer time, download time and their feedback for received quality etc. into the database 180 which is accessible by the content management module 110.

Pull Content

In this case the client device 130 controls the selection of content and type of representation, such as quality in case of video content, to retrieve from the content serving node 120. The content serving node 120 may respond to the client device's 130 request while not playing any role in selection of content. Instead, the client device 130 is managed by the content management module 110, which analyzes data, e.g. from the database 180, to recommend content as discussed below.

To illustrate pulling content, e.g. media content, from the content serving node 120, consider a MPEG-DASH example. MPEG-DASH is an adaptive HTTP streaming mechanism, where a DASH video client, which may correspond to the dynamically updatable client reporting module herein, controls what content and their representations to fetch from the content serving node 120. A DASH server, as an example of the content serving node 120, may store content in variable length segments along with their so called manifest files, which describe properties of the content and a location of the content. The DASH client retrieves the manifest file to know the content alternates and fetches the segment of the content based on certain rules. According to some embodiments herein, the client device 130 may get a recommendation from the content management module 110 before each segment of content is requested from the content serving node 120.

Action 202

The content management module 110 obtains the indication.

This may mean that the content management module 110 may receive the request from the client device 130, e.g. via the content serving node 120.

The content management module 110 may predict that the client device 130 will most likely request, or be fed with, the content.

The content management module 110 may broadcast the content to the client device 130 without request.

In some embodiments, the content management module 110 thus orchestrates when content needs to be cached for reliable and fast access by the client device 130, before the client device 130 has requested the content.

With the video content example, action 202 may include that a client device 130 is requesting a video film from the content serving node 120. The content serving node 120 has available a set of caches in the computer network 100, such as a CDN, some of which are persistent, some of which are volatile. The content management module 110, possibly provided as a cloud-service, primes the caches 140 that may become involved for a particular user session with the film content—segments—in appropriate format and size (representation).

Action 203

One or more of the plurality of caches 140 may send a respective set of parameters to the content management module 110.

The respective set of parameters comprises a transport capability parameter relating to transport capability, in a past time period, from the plurality of caches 140 to an output means 131 for outputting of the content.

The output means 131 is associated with the client device 130. In some examples, the cache is an intermediate cache, located externally with respect to the client device 130. In other examples, the cache may refer to an internal cache, comprised in the client device 130.

The set of parameters may further comprise a storage parameter relating to storage capability of each cache 141-144 of the plurality of caches.

The storage parameter may be a function that gives the storage parameter as output. As an example, the function may output a value of the storage parameter that varies with time, e.g. an available storage capacity, indicating free storage capacity of a particular cache, may be less during peak hours in the morning and evening. In other examples, the storage parameter may be a static value or the like. The static value may for example indicate total storage capacity, whether it is available or not.

Moreover, the storage parameter may indicate whether respective storage capacity of each cache 141-144 is volatile, or non-volatile, i.e. persistent.

In some examples, the content management module 110 receives the respective set of parameters from each of the plurality of caches 140.

In further examples, the content management module 110 receives the respective set of parameters from a database including information about caches.

The caches 140 may keep a record of all contents it possess and its available storage capacity at any given time. The caches may report this information, eg. what contents it possesses, to the database either on receiving each content segment from the content serving node 120 or periodically. The caches 140 may also update the content serving node 120 if it is up and running or down by keep alive message, such as status indications, to the content serving node 120. The record may be for instance a characteristic of the encrypted content, e.g. a hash, a post of a database or the like.

In short, the database may have the same information that otherwise may be sent directly to the content management module 110. A setup may be that all other nodes, e.g. all caches 140, periodically, or event based, e.g. on change of conditions, update the database.

Action 204

Subsequent to action 203, the content management module 110 obtains the respective set of parameters for each cache 141-144 of the plurality of caches 140.

Action 205

The client device 130 may send a further set of parameters, e.g. to the content management module 110. The further set of parameters is described in more detail in action 206 below.

Action 206

The content management module 110 may obtain the further set of parameters,

Subsequent to action 205, the content management module 110 may receive the further set of parameters from the client device 130, or the content serving node 120 to which the client device 130 has connected.

The further set of parameters may comprise one or more of:
  type of service executing in client device 130, and
  a user parameter relating to intent of a user of the client device 130 with respect to the content.

Thanks to that the type of service may be specified by the further set of parameters, differentiation between different services may be performed. For example, live-streaming services may be prioritized over downloading of files, including e.g. software programs, music, texts of books, videos, etc.

By means of the user parameter improved prediction may be achieved by taking into account explicit behaviour of a particular user of the client device 130. The user parameter may, for example, include historical behaviour, age, gender, health, hairstyle, education, etc. of the particular user. One or all of these parameters may affect when to cache and what to cache.

Action 207

The content management module 110 predicts, for said each cache, a respective predicted transport capability based on the respective set of parameters, wherein each respective predicted transport capability relates to the upcoming time period.

In some embodiments, the content management module 110 may predict the respective transport capability by finding the respective predicted transport capability while using of a first reasoning engine, which includes artificial intelligence. The first reasoning engine provides prediction beyond interpolation and/or machine learning procedures. An example realization of the first reasoning engine includes an inference engine, analytics machinery, a custom designed model of networking and storage resources said model consisting of ontology and inferred learnings about the transport capabilities. Together with a digital representation of the decision process involved, this embodies the first reasoning engine. Detailed examples of the realisation is the human supervised insights of causality patterns in delay behaviour in the transport capability; selection of granularity of model and real time supervision of transport capability for a particular cache or type of cache based on inferred, human supervised learnings or automated selection based on instant feedback from a quality if experience capturing module, a module that has been trained to detect indications of user experience of quality of audio-visual content consumption.

In some further embodiments, the content management module 110 may further predict, for said each cache, a further respective predicted transport capability based on the respective set of parameters. Each further respective predicted transport capability may relate to the upcoming time period for an alternative scenario.

Action 208

The content management module 110 segments the content into a plurality of segments based on the respective predicted transport capability. It shall be noted that the content may include further segments than the plurality of segments considered here. The plurality of segments may be said to be adapted to a first scenario.

In the further embodiments mentioned in conjunction with action 207, the content management module 110 may further segment the content into a further plurality of segments, i.e. other segmentation than for the plurality of segments, based on the further respective predicted transport capability. For clarity, it shall be said that the plurality of segments may be referred to as a first plurality of segments and the further plurality of segments may be referred to as a second plurality of segments. The first and second plurality of segments differs from each other in how the content have been segmented. The further plurality of segments may be adapted to the alternative scenario. The alternative scenario is different from the scenario to which the plurality of segments is adapted.

An example scenario is that the first and/or second reasoning engine produces a set of more or less likely delay behaviour scenarios, each of which is associated with detection points. The action taken is to a) create segments suitable for optimal experience and delivery effect for the different scenarios and b) create a retrieval policy to the receiving client.

Action 209

For each segment of the plurality of segments, the content management module 110 selects at least one respective cache 141-144 of the plurality of caches 140 based on the respective predicted transport capabilities, wherein the selected at least one respective cache 141-144 is selected for storing of said each segment.

The selecting 209 may comprise finding the selected at least one respective cache by use of a second reasoning engine, which includes artificial intelligence, wherein the second reasoning engine finds the selected at least one respective cache by taking the respective predicted transport capability for said each cache into account.

Referring to the video content example, it is in this action selected which caches to prime, which segment size (quality) to use, when to prime the cache, etc. based on among other things a real-time analysis of the prevailing and historic transport characteristics of the connections between the device client and the individual caches. This also includes a decision of what kind of intermediate frames, in case of video content, to prime the caches with to handle a smoother transition of significant bitrates changes, changes that are predicted based on historic and real-time information.

Action 210

In some embodiments, a set of selected caches 140 may comprise the selected at least one cache 141-144 for the plurality of segments. The content management module 110 may then send, to the client device 130, a first instruction instructing the client device 130 to retrieve the content from the set of selected caches 141-144. Action 210 may be included in action 209 or action 210 may be performed before action 209.

Action 211

The client device 130 may receive the first instruction. The client device 130 subsequently acts according to the first instruction. For example, the client device 130 retrieves the content from the set of selected caches 141-144 as given by the first instruction.

Action 212

The content management module 110 may send, to the client device 130, a second instruction recommending the client device 130 to retrieve the content from the set of selected caches 141-144. Action 212 may be included in action 209 or action 212 may be performed before action 209.

Action 213

The client device 130 may receive the second instruction. The client device 130 subsequently acts according to the second instruction. For example, the client device 130 retrieves the content from the set of selected caches 141-144 while considering the recommendations given by the second instruction, but the client device 130 may decide to retrieve from other caches by use of a local decision in the client device 130. The local decision may be performed by the dynamically updatable client reporting module, which may have been provided by the content management module 110, see action 218 below.

Action 214

The content management module 110 may send, to the client device 130, a third instruction providing the client device 130 with an algorithm to be used by the client device 130 for deciding from which cache 141-144 among the set of selected caches 141-144 to retrieve data from. Action 214 may be included in action 209 or action 214 may be performed before action 209.

In action 210, 212, 214, the client device 130 receives information about which caches to use and assistance on predicting bitrates as well as proposal on segment depth in the buffer from the content management module 110.

Action 215

The client device 130 may receive the third instruction. The client device 130 subsequently acts according to the third instruction. For example, the client device 130 retrieves the content from the caches 141-144 as given by the algorithm.

In some embodiments, the dynamically updatable client reporting module 4 may include the algorithm.

Action 216

For each segment of the plurality of segments, the content management module 110 provides a respective command to the content serving node 120. The command instructs the content serving node 120 to feed said each segment to the selected at least one respective cache.

The content management module 110 assists the client device 130 in a content retrieval process and manages a storage orchestration, i.e. handling of how to segment, what segments to store and where, by priming the caches 140 by using information from the database 180. The content management module 110 may maintain a model of transport characteristics for all relevant connections in the CDN, including those between the client device 130 and other client devices and between respective caches 140 and the client device 130. Information reported by the client device and Explicit Congestion Notification (ECN) information from the caches are gathered and mathematically analyzed for finding a pattern, such as an average bitrate, a typical bitrate variation, a probability distribution function relating to key performance indicators such as empty buffer, etc.

The content management module 110 may also decide to push content to the client device caches, via peer-to-peer networking, using predictions about bitrate variations and other suitable transport characteristics such as jitter and content that is likely to be consumed.

Action 217

The content serving node 120 may receive the respective command for each segment of the plurality of segments. Then, the content serving node 120 primes the caches accordingly, i.e. pushes the selected segment to the cache indicated in the command.

The content serving node 120 may get recommendation, see action 213 above, about video from the content management node 110 and mandates the suitable cache to push the contents to the client by either HTTP PUSH or any other push content mechanism. The selected cache pushes the contents and reports to the contents serving node 120 about the delivery status of the video content to the client device 130.

Action 218

The content management module 110 may provide the client device 130 with a dynamically updatable client reporting module 4 for reporting the further set of parameters.

The dynamically updateable client reporting module 4 may be a declarative realization such as JavaScript, Python or the like.

An advantage is that reported parameters may be determined by the content management module 110, for example when updating a prediction model for e.g. predicted transport capabilities, predicted user intent, etc.

Figure 3:
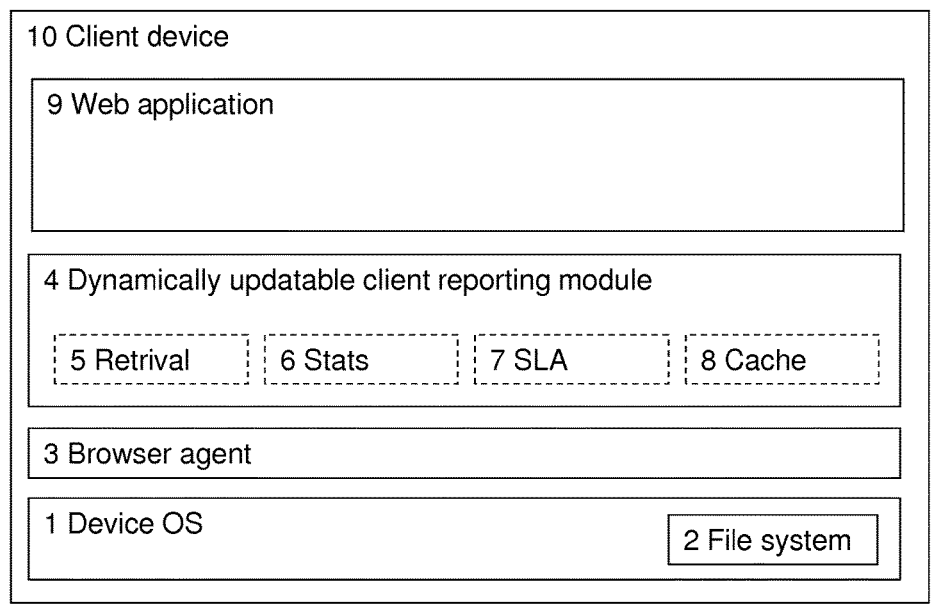
FIG. 3 is a block diagram illustrating an exemplifying client device.

With reference to the video content example, it may be that it is desired to validate that a film, i.e. the video content, has been delivered in the case that a segment of the video content was retrieved from caches not under the control of the CDN operator, such as the content serving node 120. Typically, these caches are volatile caches, such as caches in peer client devices, in the client device itself etc. In order to validate the video content, the dynamically updatable client reporting module may be used. In some examples, the dynamically updatable client reporting module may be realized as a component executing in a browser, such as a web-browser of the client device 130. It may here be said that the dynamically updatable cache reporting module may be similar to the dynamically updatable client reporting module with respect to architecture, e.g. as shown in FIG. 3 below. The component, referring to the dynamically updatable client reporting module and/or the dynamically updatable cache reporting module, is isolated from the actual web page, or web application, from an execution and storage perspective. The component may be isolated from the actual web page by running it in its own context, such as virtual machine, container according to Docker or similar. In this manner, it is made impossible, or at least hard, for an application to control it. This is advantageous, since the isolated execution and storage prevents, for examples, a web application to take control of the component and make it report "not delivered", which possibly would cause the content provider not to charge for the content that actually was delivered. Therefore, the component, or the dynamically updatable client reporting module, may be seen as part of the CDN and connected to the content serving node 120. This component is responsible for retrieving the content as per user request via an application, see FIG. 3.

The device CDN video retrieval component will report to its backend when the web application has received the content together with timing information, to be used in Service Layer Agreement (SLA) fulfillment procedures.

Action 219

The content management module 110 may provide said each cache 141-144 with a dynamically updatable cache reporting module for reporting the set of parameters. The cache reporting module is intended to be a local extension—agent—of the content managing module, gathering, analyzing and reporting on data and insights obtained locally. It is as such designed to be updated continuously in its inner behavior by the central entity on what to collect, which algorithm to use in analyzing collected data (the algorithm also being updated) and what action to take including reporting.

Now further elaborating on the video content example, the embodiments herein provide for the selection of video contents for the client device 130 as an outcome of data analysis by the content management module 110. The data, such as the set of parameters and the further set of parameters, are collected by the content management module 110 through different sources, such as the caches 140 and the client device 130, to store into the database 180 and input to the content management module 110 for analysis and to build recommendation of video contents for client device.

To perform this task the content management module 110 requires two main interfaces which are as follows.

The content management module 110 is provided with the metadata of all video contents available in content provider network, i.e. size of the video, number of different video representations and their formats, if a video is stored as one big segment or multiple smaller segments, segment size and their locations, provided by e.g. an Uniform Resource Locator (URL). For example, in MPEG-DASH all this information exists in a manifest file called Media Presentation Description (MPD).

Next, the content management module 110 owns an interface to the database 180 which consists of various information, such as previous and ongoing session statistics, live estimated bitrate in a radio cell, and other transport characteristics measurement, e.g. ECN, Round Trip Time (RTT) and more, of a path between the client device 130 and the content serving node 120, user preferences and feedback etc.

The content management module 110 may read a set of data, such as the set of parameters and/or the further set of parameters, from the database 180 and matches the user history, preferences and popular trend with available video contents in content provider network to recommend suitable video contents. Once the client device 130 accepts to watch the recommended video, the next question is what video representation or quality to offer.

The content management module 110 plays its role by analyzing the transport capabilities in the computer network 100 towards the client device 130 and subscription policy with content serving node 120, or the content provider. For example, a video is presented in different representations with different media rates, i.e. high, medium and low quality representations; the content management module 110 gets knowledge of estimated available channel bitrate and selects the suitable video representation.

The content management module 110 continues to monitor video downloading process at client device 130 and helps it to handle the changing network conditions. For example, if the transport channel degrades from a high throughput to lower one, the content management module 110 recommends client to fetch lower media rate video and vice versa.

If network transport characteristics, such as the transport capability parameter, changes significantly, e.g. dropping from a very high bitrate to a very low bitrate, the content management module 110 recommends intermediate quality video frames to give better quality of experience to the clients.

In addition to video contents recommendations, such as the second instruction above, the content management module 110 also assists video device clients where to retrieve those contents from, because video contents may be spread over different locations, network cache, peer cache, media server etc. The content management module 110 finds out suitable video cache based on various parameters like end-to-end delay, congestion in that transport channel and estimated bitrate of the path.

Content Cache

In addition to the content serving node 120, the content providers spread contents over different caches so that clients can fast retrieve them. Some of the content caches are dedicated network node/cache (persistent) in CDN and while others are non-persistent peer caches.

Selection of Source Cache

The selection of content cache to download videos from may be based on the recommendation from the content management module 110, which analyzes data like network transport characteristics between client and different caches, the availability of contents in those caches, etc. The content management module 110 may recommend what contents to provide to the client device 130 with their respective base URL, e.g. pointing towards content cache or the content serving node 120.

Content Synchronization

The content provider synchronizes the content caches with the content serving node 120 to update what contents are present at which cache at a given time. In case of volatile content cache the cache also updates its own status (up or down) to the content serving node 120. This synchronization can be achieved by that the cache is reporting its status to the database 180, so that the content management module 110 may be made aware of it.

Cache Authentication

To protect copyright each client authenticates itself to the content caches before downloading any video.

Delivery Reporting

To let the content providers know the timely delivery of the video segment the content retrieval component of client device reports to the content provider after a successful download of the video segment from a base URL.

Use Cases

Pushing Intermediate Quality Video Frame

As said, in a data adaptive video delivery system the statistics/data gathered about historic and prevailing video delivery sessions determines the video quality representation to be delivered to the client device. Notably, the gathering of the statistics/data may be performed by the client device and/or the content management module. The data reflecting better channel conditions result in higher video quality to the user and vice versa.

Consider a use case where a content serving node 120 stores or generates different quality representations of a video film in smaller segments (instead of a large file) at various caches or at dedicated network node. A user in an excellent network transport condition is watching video on its device; this video is being pushed to the client device by the content serving node 120 based on recommendation from the content management module 110. The client device is getting high media rate video segments. Suddenly, the content management module 110 discovers- or predicts the possibility of—the network bottleneck by statistics it gets from database, or local cache probe, e.g. the dynamically updatable cache reporting module. Instead of pushing high media rate video content to the client device, the content management module 110 recommends the content serving node, or one of the selected caches, to push the lower media rate video segments best matched with prevailing network conditions. This may be a spread of rates depending on the precision of the prediction. The content management module 110 makes sure that the switching, e.g. performed by the content serving node, from a higher quality video representation to a lower one becomes be as smooth as possible to give better quality of experience to the user. For this purpose, the content management module instructs the content serving node to store intermediate video quality segments, i.e. video frames with gradual downgrading quality. After realizing the change in network conditions the content serving node pushes according to instructions from content management module intermediate video segments to the client device before sending the lower media rate segments. This may include the client selecting among a set of alternatives pushed by the network.

In addition to provide better quality of experience to the user, another advantage of pushing the intermediate frames is that it gives an extra time to the content management module 110 to find out if the network congestion is persistent or just a spike for very short interval, i.e. a temporary congestion. If the discovered congestions last for longer time the content serving node switches according to instructions from content management module to the lower media rate video else after passing that spike the content serving node switches according to instructions from content management module back to higher quality video. Hence, keeping Quality of Experience (QoE) intact.

FIG. 3 shows an exemplifying client device 10, such as the client device 130 of FIG. 1.

The client device 10 includes a number of generic hardware components (not shown), such as memory, processor, internal bus function, power supply etc.

Moreover, the client device 10 includes a number of software modules, such as a device Operating System (OS) 1, a file system 2, a browser agent 3, a dynamically updatable client reporting module 4, and a web application 9. The web application 9 may be a web browser or the like.

The dynamically updatable client reporting module 4, which may be implemented in JavaScript, html, Cascading Style Sheets (CSS) or the like, may comprise one or more of the following sub-modules: a retrieval module 5, a statistics module 6, a SLA module 7, and a cache module 8.

The retrieval module 5 may handle for example the algorithm used for finding which cache to retrieve a segment from and establishing and managing connectivity to the caches.

The statistics module 6 may handle gathering of data, for instance using statistics provided by the browser API's or from data collected by the other modules, processing of said data and submission of information sent to the database, the content management module or to other modules as per instruction.

The SLA module 7 may handle monitoring locally in the device of quality targets of the service to be delivered and triggering warnings to central server about targets not being met (or about not to be met) or trigger automated local device actions to address the situation, such as informing the cache module causing it to change behaviour . . . .

The cache module 8 may handle the actual retrieval or reception of data and the local storage of data, making it available for retrieval of the web application directly or via the browser. The cache module takes instructions for retrieval from the content management module, instructions that may include listening to SLA status events to which predefined behaviours of the cache retrieval are associated.

Note that there are a number of new functions and APIs being discussed and added to e.g. the web browser. This includes, but is not limited to, the following that have a relation to this invention:

World Wide Web Consortium (W3C) Push Application Programming Interface (API), which is backed up by the Internet Engineering Task Force (IETF) Push protocol. Can be used in combination with local storage to push out content all the way to the device.

Http2 that offer push options, and is generally more feature rich than http1.1.

The new Fetch API, adding advanced functionality for the web app to use (e.g. http2) protocol features.

The p2p data channels introduced by WebRTC can be used for content delivery.

The emerging multi-path support in protocols like TCP and RTP is expected to also become applicable in new UDP—based transport protocols, allowing for the client to connect to a cache using different connections.

Likewise, an enhancement of the WebSocket API is expected.

The Quota API that enables the web app to manage caching (by having access to data about memory availability).

Common for the new APIs (Push, Fetch, WebRTC data, updated WebSocket) is that the trend is that more info about the lower layers will be available to the application (in other words, there will be more data available that can be used for "data driven delivery").

The Streams API enables the application, or a worker of some kind (e.g. the trusted service worker) to deal with a continuous stream of data rather than chunks/blobs. It also allows for back pressure, i.e. allowing a client device to signal to a content serving node 120 that the content delivered cannot be handled by the client device, i.e. content at for example lower bit rate is required.

Security features, such as Object level security, (sub) resource integrity, identity, Secure Origins, crypto APIs and other things that, if developed in the right way and used smartly can enable efficient media deliver without any leakage of information.

Figure 4:
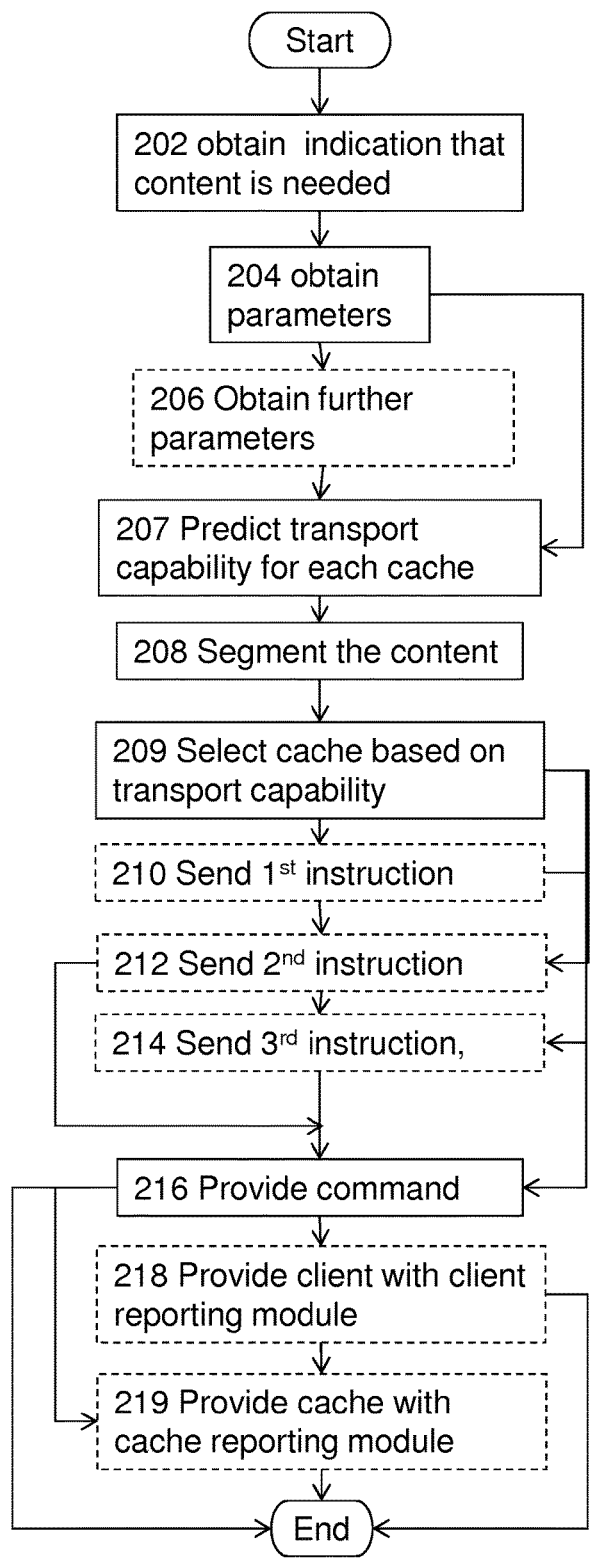
FIG. 4 is a flowchart illustrating embodiments of the method in the content managing module.

In FIG. 4, a schematic flowchart of exemplifying methods in the content management module 110 is shown. Again, the same reference numerals as above have been used to denote the same or similar features, in particular the same reference numerals have been used to denote the same or similar actions. Accordingly, the content management module 110 performs a method for managing content in a content distribution network 100.

As mentioned, the content distribution network 100 comprises a plurality of caches 140 for active caching of the content, a content serving node 120 for serving the content to the plurality of caches 140, a client device 130 to which the content is deliverable.

Again, the content may comprise one or more of: data, a data file, an image, a video, a text, a streamed audio and/or video sequence. The client device 130 may be a M2M device or a user equipment.

One or more of the following actions may be performed in any suitable order. Actions which are not performed by the content management module 110 are omitted in the follow description.

Action 202

The content management module 110 obtains an indication that the content is to be delivered, in an upcoming time period, to the client device 130.

Action 204

The content management module 110 obtains a respective set of parameters for each cache 141-144 of the plurality of caches 140, wherein the respective set of parameters comprises a transport capability parameter relating to transport capability, in a past time period, from the plurality of caches 140 to an output means 131 for outputting of the content, wherein the output means 131 is associated with the client device 130.

The respective set of parameters may further comprise a storage parameter relating to storage capability of each cache 141-144 of the plurality of caches.

Action 206

The content management module 110 may obtain a further set of parameters.

The further set of parameters may comprise one or more of:
a type of service executing in client device 130,
a user parameter relating to intent of a user of the client device 130 with respect to the content, and the like.

Action 207

The content management module 110 predicts, for said each cache, a respective predicted transport capability based on the respective set of parameters, wherein each respective predicted transport capability relates to the upcoming time period.

The predicting 207 may comprise finding the respective predicted transport capability by use of a first reasoning engine, which includes artificial intelligence.

In some embodiments, the predicting 207 comprises predicting, for said each cache, a further respective predicted transport capability based on the respective set of parameters, wherein each further respective predicted transport capability may relate to the upcoming time period for an alternative scenario, and the segmenting 208 may comprise segmenting the content into a further plurality of segments based on the further respective predicted transport capability, wherein the further plurality of segments may be adapted to the alternative scenario.

Action 208

The content management module 110 segments the content into a plurality of segments based on the respective predicted transport capability.

Action 209

For each segment of the plurality of segments, the content management module 110 selects at least one respective cache 141-144 of the plurality of caches 140 based on the respective predicted transport capabilities, wherein the selected at least one respective cache 141-144 is selected for storing of said each segment.

The selecting 209 may comprise finding the selected at least one respective cache by use of a second reasoning engine, which includes artificial intelligence, wherein the second reasoning engine finds the selected at least one respective cache by taking the respective predicted transport capability for said each cache into account.

In some embodiments, when the selecting 209 comprises the sending 214 of the third instruction, the dynamically updatable client reporting module 4 may include the algorithm.

Action 210

In some embodiments, a set of selected caches 140 may comprise the selected at least one cache 141-144 for the plurality of segments.

In these embodiments, the content management module 110 may send, to the client device 130, a first instruction instructing the client device 130 to retrieve the content from the set of selected caches 141-144.

Action 212

The content management module 110 may send, to the client device 130, a second instruction recommending the client device 130 to retrieve the content from the set of selected caches 141-144.

Action 214

The content management module 110 may send, to the client device 130, a third instruction providing the client device 130 with an algorithm to be used by the client device 130 for deciding from which cache 141-144 among the set of selected caches 141-144 to retrieve data from.

Action 216

For each segment of the plurality of segments, the content management module 110 provides a respective command to the content serving node 120, wherein the command instructs the content serving node 120 to feed said each segment to the selected at least one respective cache.

Action 218

The content management module 110 may provide the client device 130 with a dynamically updatable client reporting module 4 for reporting the further set of parameters.

Action 219

The content management module 110 may provide said each cache 141-144 with a dynamically updatable cache reporting module for reporting the set of parameters.

Figure 5:
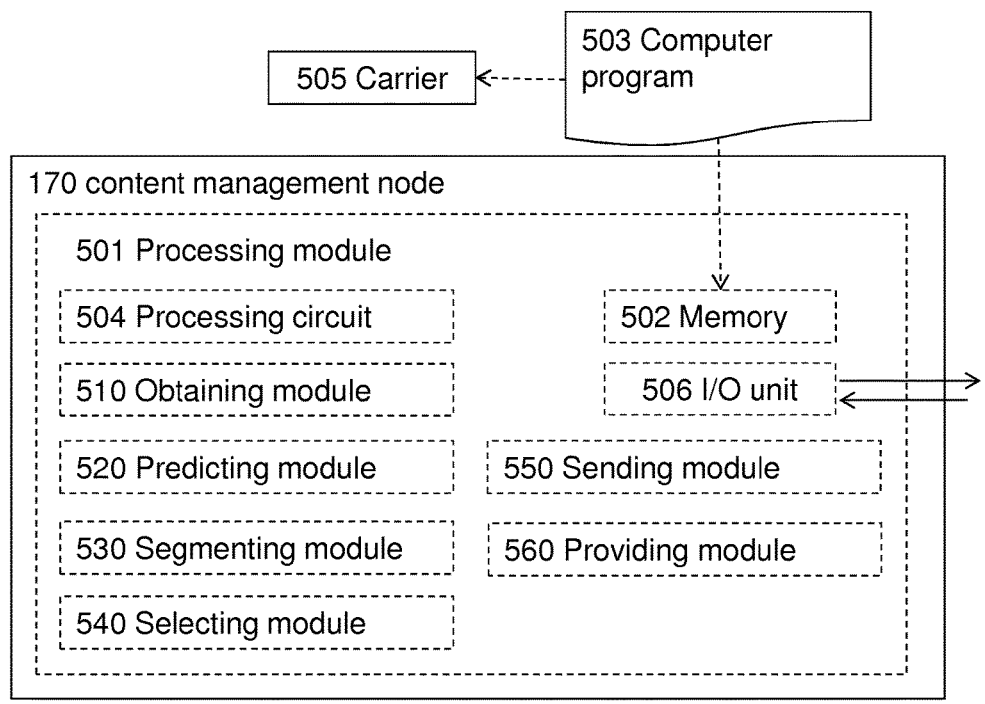
FIG. 5 is another block diagram illustrating embodiments of the content managing module.

With reference to FIG. 5, a schematic block diagram of embodiments of the content management node 170 of FIG. 1 is shown. The content management node 170 may include the content management module 110. The content management module 110 may be included in the content serving node 120 in other examples. The content management module 110 is thus configured to manage content in a content distribution network 100.

As mentioned, the content distribution network 100 comprises a plurality of caches 140 for active caching of the content, a content serving node 120 for serving the content to the plurality of caches 140, a client device 130 to which the content is deliverable.

Again, the content may comprise one or more of: data, a data file, an image, a video, a text, a streamed audio and/or video sequence. The client device 130 may be a M2M device or a user equipment.

The content serving node 120 may include the content management module 110 according to embodiments disclosed herein. The content management node 170 may include the content management module 110 according to embodiments disclosed herein.

The content management module 110 may comprise a processing module 501, such as a means, one or more hardware modules and/or one or more software modules for performing the methods described herein. This means that in some examples the processing module 501 may be the content management module 110.

The content management module 110 may further comprise a memory 502. The memory may comprise, such as contain or store, a computer program 503.

According to some embodiments herein, the processing module 501 comprises, e.g. 'is embodied in the form of' or 'realized by', a processing circuit 504 as an exemplifying hardware module. In these embodiments, the memory 502 may comprise the computer program 503, comprising computer readable code units executable by the processing circuit 504, whereby the content management module 110 is operative to perform the methods of FIG. 2 and/or FIG. 4.

In some other embodiments, the computer readable code units may cause the content management module 110 to perform the method according to FIGS. 2 and/or 4 when the computer readable code units are executed by the content management module 110.

FIG. 5 further illustrates a carrier 505, or program carrier, which comprises the computer program 503 as described directly above.

In some embodiments, the processing module 501 comprises an Input/Output unit 506, which may be exemplified by a receiving module and/or a sending module as described below when applicable.

In further embodiments, the processing module 501 may comprise one or more of a obtaining module 510, a predicting module 520, a segmenting module 530, a selecting module 540, a sending module 550 and a providing module 560 as exemplifying hardware modules. In other examples, one or more of the aforementioned exemplifying hardware modules may be implemented as one or more software modules.

Therefore, according to the various embodiments described above, the content management module 110, the processing module 501 and/or the obtaining module 510 is operative to, such as configured to, obtain an indication that the content is to be delivered, in an upcoming time period, to the client device 130.

Furthermore, the content management module 110, the processing module 501 and/or the obtaining module 510, or another obtaining module (not shown) is operative to, such as configured to, obtain a respective set of parameters for each cache 141-144 of the plurality of caches 140, wherein the respective set of parameters comprises a transport capability parameter relating to transport capability, in a past time period, from the plurality of caches 140 to an output means 131 for outputting of the content, wherein the output means 131 is associated with the client device 130.

The content management module 110, the processing module 501 and/or the predicting module 520 is operative to, such as configured to, predict, for said each cache, a respective predicted transport capability based on the respective set of parameters, wherein each respective predicted transport capability relates to the upcoming time period.

The content management module 110, the processing module 501 and/or the segmenting module 530 is operative to, such as configured to, segment the content into a plurality of segments based on the respective predicted transport capability.

Moreover, the content management module 110, the processing module 501 and/or the selecting module 540 is operative to, such as configured to, select, for each segment of the plurality of segments, at least one respective cache 141-144 of the plurality of caches 140 based on the respective predicted transport capabilities, wherein the selected at least one respective cache 141-144 is selected for storing of said each segment.

Additionally, the content management module 110, the processing module 501 and/or the providing module 560 is operative to, such as configured to, provide, for each segment of the plurality of segments, a respective command to the content serving node 120, wherein the respective command instructs the content serving node 120 to feed said each segment to the selected at least one respective cache.

In some embodiments, a set of selected caches 141-144 may comprise the selected at least one cache 141-144 for the plurality of segments.

In these embodiments, the content management module 110, the processing module 501 and/or the sending module 550 may be operative to one or more of, such as configured to, send, to the client device 130, a first instruction instructing the client device 130 to retrieve the content from the set of selected caches 141-144, and to send, to the client device 130, a second instruction recommending the client device 130 to retrieve the content from the set of selected caches 141-144, and to send, to the client device 130, a third instruction providing the client device 130 with an algorithm to be used by the client device 130 for deciding from which cache 141-144 among the set of selected caches 141-144 to retrieve data from.

The content management module 110, the processing module 501 and/or the obtaining module 510, or a further obtaining module (not shown) may be operative to, such as configured to obtain a further set of parameters. The further set of parameters may comprise one or more of:
  type of service executing in client device 130,
  a user parameter relating to intent of a user of the client device 130 with respect to the content; and the like.

The content management module 110, the processing module 501 and/or a finding module (not shown) may be operative to, such as configured to, find the respective predicted transport capability by use of a first reasoning engine, which may include artificial intelligence.

The content management module 110, the processing module 501 and/or another finding module (not shown) may be operative to, such as configured to, find the selected at least one respective cache by use of a second reasoning engine, which may include artificial intelligence, wherein the second reasoning engine may find the selected at least one respective cache by taking the respective predicted transport capability for said each cache into account.

The content management module 110, the processing module 501 and/or the providing module 560, or a further providing module (not shown), may be operative to, such as configured to, provide the client device 130 with a dynamically updatable client reporting module 4 for reporting the further set of parameters.

The content management module 110, the processing module 501 and/or the sending module 550, or another sending module (not shown), may be operative to, such as configured to, send the third instruction, wherein the dynamically updatable client module 4 may include the algorithm.

The content management module 110, the processing module 501 and/or the providing module 560, or yet a further providing module (not shown), may be operative to, such as configured to, provide said each cache 141-144 with a dynamically updatable cache reporting module for reporting the set of parameters. This means that each cache 141-144 is provided with a respective dynamically updatable cache reporting module. It is preferred that each cache 141-144 has been provided with, e.g. installed or use, the same dynamically updatable cache reporting module, e.g. the same version of it. Here, version refers to e.g. a version of the software making up the dynamically updatable cache reporting module.

In some further embodiments, the content management module 110, the processing module 501 and/or the predicting module 520, or another predicting module (not shown), may be operative to, such as configured to, predict, for said each cache, a further respective predicted transport capability based on the respective set of parameters, wherein each further respective predicted transport capability relates to the upcoming time period for an alternative scenario.

Moreover, in these further embodiments, the content management module 110, the processing module 501 and/or the segmenting module 530, or another segmenting module (not shown), may be operative to, such as configured to, segment, for said each cache, the content into a further plurality of segments based on the further respective predicted transport capability, wherein the further plurality of segments are adapted to the alternative scenario.

As used herein, the term "node" may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments are implemented in a distributed manner.

As used herein, the term "program carrier" may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the term "set of", such as set of devices, may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a content management apparatus, for managing content in a content distribution network, wherein the content distribution network comprises a plurality of caches for active caching of the content, a content serving node for serving the content to the plurality of caches, and a client device to which the content is deliverable, wherein the method comprises:
 obtaining an indication that the content is to be delivered, in an upcoming time period, to the client device;
 obtaining a respective set of parameters for each cache of the plurality of caches, wherein the respective set of parameters comprises a transport capability parameter relating to transport capability, in a past time period, from the plurality of caches to an output means for outputting of the content, wherein the output means is associated with the client device;
 predicting, for said each cache, a respective predicted transport capability based on the respective set of parameters, wherein each respective predicted transport capability relates to the upcoming time period;
 segmenting the content into a plurality of segments based on the respective predicted transport capability, and wherein the method comprises, for each segment of the plurality of segments:
 selecting at least one respective cache of the plurality of caches based on the respective predicted transport capabilities, wherein the selected at least one respective cache is selected for storing of said each segment; and
 providing a respective command to the content serving node, wherein the respective command instructs the content serving node to feed said each segment to the selected at least one respective cache.

2. The method of claim 1, wherein a set of selected caches comprises the selected at least one cache for the plurality of segments, wherein the method comprises one or more of:
 sending, to the client device, a first instruction instructing the client device to retrieve the content from the set of selected caches;
 sending, to the client device, a second instruction recommending the client device to retrieve the content from the set of selected caches; and
 sending, to the client device, a third instruction providing the client device with an algorithm to be used by the client device for deciding from which cache among the set of selected caches to retrieve data.

3. The method of claim 2, wherein:
 the method comprises obtaining a further set of parameters, the further set of parameters comprises a type of service executing in client device;
 the method comprises providing the client device with a dynamically updatable client reporting module for reporting the further set of parameters; and
 the selecting comprises the sending of the third instruction, wherein the dynamically updatable client reporting module includes the algorithm.

4. The method of claim 1, wherein the set of parameters comprises a storage parameter relating to storage capability of each cache of the plurality of caches.

5. The method of claim 1, wherein the method comprises obtaining a further set of parameters, wherein the further set of parameters comprises type of service executing in client device.

6. The method of claim 5, wherein the method comprises providing the client device with a dynamically updatable client reporting module for reporting the further set of parameters.

7. The method of claim 1, wherein the predicting comprises finding the respective predicted transport capability by use of a first reasoning engine, which includes artificial intelligence.

8. The method of claim 1, wherein the selecting comprises finding the selected at least one respective cache by use of a second reasoning engine, which includes artificial intelligence, wherein the second reasoning engine finds the selected at least one respective cache by taking the respective predicted transport capability for said each cache into account.

9. The method of claim 1, wherein the method comprises providing said each cache with a dynamically updatable cache reporting module for reporting the set of parameters.

10. The method of claim 1, wherein the predicting comprises predicting, for said each cache, a further respective predicted transport capability based on the respective set of parameters, wherein each further respective predicted transport capability relates to the upcoming time period for an alternative scenario, and wherein the segmenting comprises segmenting the content into a further plurality of segments based on the further respective predicted transport capability, wherein the further plurality of segments are adapted to the alternative scenario.

11. The method of claim 1, wherein the content comprises one or more of: data, a data file, an image, a video, a text, a streamed audio and/or video sequence.

12. The method of claim 1, wherein the client device is a M2M device or a user equipment.

13. A content management apparatus configured to manage content in a content distribution network, wherein the content distribution network comprises a plurality of caches for active caching of the content, a content serving node for serving the content to the plurality of caches, a client device to which the content is deliverable, wherein the content management apparatus comprises:
 an input/output circuit; and
 a processing circuit and memory, wherein the processing circuit and memory are configured to:
 obtain an indication that the content is to be delivered, in an upcoming time period, to the client device;
 obtain a respective set of parameters for each cache of the plurality of caches, wherein the respective set of parameters comprises a transport capability parameter relating to transport capability, in a past time period, from the plurality of caches to an output means for outputting of the content, wherein the output means is associated with the client device;
 predict, for said each cache, a respective predicted transport capability based on the respective set of parameters, wherein each respective predicted transport capability relates to the upcoming time period;
 segment the content into a plurality of segments based on the respective predicted transport capability, and wherein the processing circuit and memory are configured to, for each segment of the plurality of segments:
 select least one respective cache of the plurality of caches based on the respective predicted transport capabilities, wherein the selected at least one respective cache is selected for storing of said each segment; and
 provide a respective command to the content serving node, wherein the respective command instructs the content serving node to feed said each segment to the selected at least one respective cache.

14. The content management apparatus of claim 13, wherein a set of selected caches comprises the selected at least one cache for the plurality of segments, wherein the processing circuit and memory are configured to one or more of:

send, to the client device, a first instruction instructing the client device to retrieve the content from the set of selected caches;

send, to the client device, a second instruction recommending the client device to retrieve the content from the set of selected caches; and send, to the client device, a third instruction providing the client device with an algorithm to be used by the client device for deciding from which cache among the set of selected caches to retrieve data from.

15. The content management apparatus of claim 14, wherein:

the processing circuit and memory are configured to obtain a further set of parameters, the further set of parameters comprising a type of service executing in client device;

the processing circuit and memory are configured to provide the client device with a dynamically updatable client reporting module for reporting the further set of parameters; and the processing circuit and memory are configured to send the third instruction, wherein the dynamically updatable client module includes the algorithm.

16. The content management apparatus of claim 13, wherein the set of parameters comprises a storage parameter relating to storage capability of each cache of the plurality of caches.

17. The content management apparatus of claim 13, wherein the processing circuit and memory are configured to obtain a further set of parameters, wherein the further set of parameters comprises type of service executing in client device.

18. The content management apparatus of claim 17, wherein the processing circuit and memory are configured to provide the client device with a dynamically updatable client reporting module for reporting the further set of parameters.

19. The content management apparatus of claim 13, wherein the processing circuit and memory are configured to find the respective predicted transport capability by use of a first reasoning engine, which includes artificial intelligence.

20. The content management apparatus of claim 13, wherein processing circuit and memory are configured to find the selected at least one respective cache by use of a second reasoning engine, which includes artificial intelligence, wherein the second reasoning engine finds the selected at least one respective cache by taking the respective predicted transport capability for said each cache into account.

21. The content management apparatus of claim 13, wherein the processing circuit and memory are configured to:

provide said each cache with a dynamically updatable cache reporting module for reporting the set of parameters.

22. The content management apparatus of claim 13, wherein the processing circuit and memory are configured to predict, for said each cache, a further respective predicted transport capability based on the respective set of parameters, wherein each further respective predicted transport capability relates to the upcoming time period for an alternative scenario, and wherein the processing circuit and memory are configured to segment the content into a further plurality of segments based on the further respective predicted transport capability, wherein the further plurality of segments are adapted to the alternative scenario.

23. The content management apparatus of claim 13, wherein the content comprises one or more of: data, a data file, an image, a video, a text, a streamed audio and/or video sequence.

24. The content management apparatus of claim 13, wherein the client device is a M2M device or a user equipment.

25. A content serving node including the content management apparatus of claim 13.

26. A content management node including the content management apparatus of claim 13.

27. A non-transitory computer-readable medium comprising, stored thereupon, a computer program comprising computer readable code units that, when executed on a content serving node or a content management node in a content distribution network that comprises a plurality of caches for active caching of content, a content serving node for serving the content to the plurality of caches, and a client device to which the content is deliverable, cause the content serving node or the content management node to:

obtain an indication that content is to be delivered, in an upcoming time period, to the client device;

obtain a respective set of parameters for each cache of the plurality of caches, wherein the respective set of parameters comprises a transport capability parameter relating to transport capability, in a past time period, from the plurality of caches to an output means for outputting of the content, wherein the output means is associated with the client device;

predict, for said each cache, a respective predicted transport capability based on the respective set of parameters, wherein each respective predicted transport capability relates to the upcoming time period;

segment the content into a plurality of segments based on the respective predicted transport capability, and wherein the method comprises, for each segment of the plurality of segments:

select at least one respective cache of the plurality of caches based on the respective predicted transport capabilities, wherein the selected at least one respective cache is selected for storing of said each segment; and provide a respective command to the content serving node, wherein the respective command instructs the content serving node to feed said each segment to the selected at least one respective cache.

* * * * *